TRIPLE AXLE SUSPENSION FOR VEHICLES

Filed Oct. 18, 1963 8 Sheets-Sheet 1

INVENTOR.
Albert F. Hickman
BY
Popp and Sommer
ATTORNEYS.

TRIPLE AXLE SUSPENSION FOR VEHICLES

Filed Oct. 18, 1963 8 Sheets-Sheet 2

INVENTOR.
Albert F. Hickman
BY
Popp and Sommer
ATTORNEYS.

TRIPLE AXLE SUSPENSION FOR VEHICLES

Filed Oct. 18, 1963 8 Sheets-Sheet 3

INVENTOR.
Albert F. Hickman
BY
Popp and Sommer
ATTORNEYS.

TRIPLE AXLE SUSPENSION FOR VEHICLES
Filed Oct. 18, 1963 8 Sheets-Sheet 4
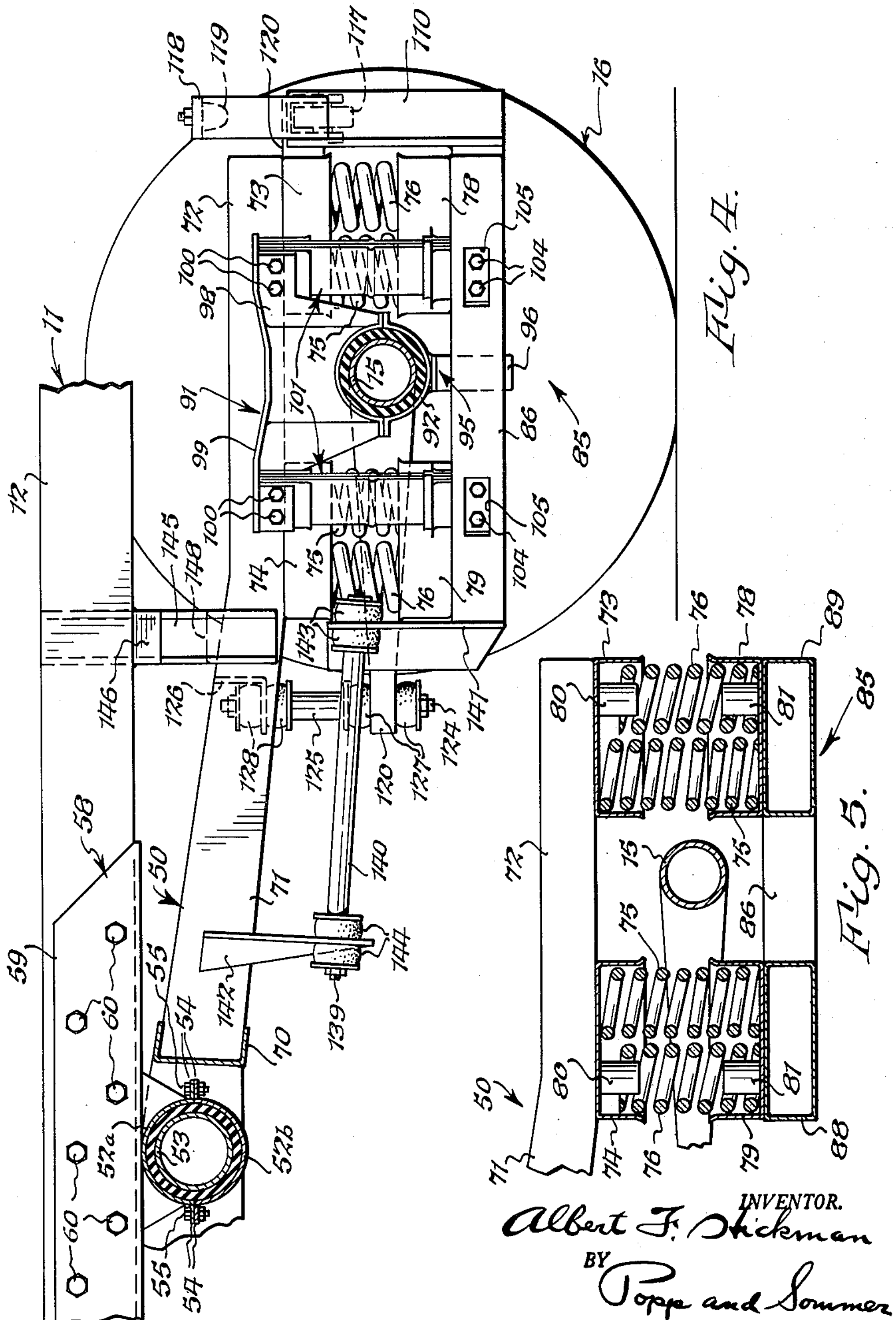
INVENTOR.
Albert F. Hickman
BY
Popp and Sommer
ATTORNEYS.

May 31, 1966 A. F. HICKMAN 3,253,838

TRIPLE AXLE SUSPENSION FOR VEHICLES

Filed Oct. 18, 1963 8 Sheets-Sheet 5

INVENTOR.
Albert F. Hickman
BY
Popp and Sommer
ATTORNEYS.

TRIPLE AXLE SUSPENSION FOR VEHICLES

Filed Oct. 18, 1963 8 Sheets-Sheet 6

INVENTOR.
Albert F. Hickman
BY
Popp and Sommer
ATTORNEYS.

May 31, 1966 A. F. HICKMAN 3,253,838

TRIPLE AXLE SUSPENSION FOR VEHICLES

Filed Oct. 18, 1963 8 Sheets-Sheet 7

INVENTOR.
Albert F. Hickman
BY
Popp and Sommer
ATTORNEYS.

May 31, 1966 A. F. HICKMAN 3,253,838

TRIPLE AXLE SUSPENSION FOR VEHICLES

Filed Oct. 18, 1963 8 Sheets-Sheet 8

INVENTOR.
Albert F. Hickman
BY
Popp and Sommer
ATTORNEYS.

United States Patent Office 3,253,838

Patented May 31, 1966

3,253,838

TRIPLE AXLE SUSPENSION FOR VEHICLES

Albert F. Hickman, Eden, N.Y.

Filed Oct. 18, 1963, Ser. No. 317,370
3 Claims. (Cl. 280—104.5)

This invention relates to a triple axle suspension for trucks, trailers, and passenger buses, and more particularly to such a suspension in which the load is distributed among the three axles.

It is a generally accepted concept that with triple alxes supporting the rear end of a highway truck, trailer or passenger bus, tire mileage is reduced at least 50% as compared with a so-called tandem or double axle suspension; that steering and handling the triple axle vehicle is more difficult because of the inherent resistance to change in position by the three axles of the suspension, and that for the same reason comparable ride characteristics, as compared with a double axle suspension, cannot be obtained, particularly when varying from an empty body ride to full load travel.

An important object of the present invention is to provide a triple axle suspension in which the load carried by the vehicle frame is carried equally by the three axles.

Another important object of the present invention is to provide a triple axle suspension which will permit the large amount of vertical movement of each axle required to provide a vertical ride as soft as load heights will allow and at low frequency.

Another important object is to provide a triple axle spring suspension which is substantially free from friction but is controlled an increased resistance to motion in proportion to the amplitude and velocity of vertical frame movement.

Another object is to provide such a triple axle spring suspension in which lateral and vertical movement of the unsprung components, as well as a slight movement thereof lengthwise of the vehicle, are permitted and resiliently resisted, the lateral and vertical resilience being sufficient, both when the vehicle is loaded and unloaded, to absorb thrust of the axles laterally of the frame particularly resulting from one wheel moving up and down relative to the others, thereby to provide increased safety, tire and gasoline mileage and stability.

Another object is to provide a simple and effective compensating means connecting the companion ends of the three axles and through which excess load on any one wheel is transmitted to its companion pair of wheels on the same side of the vehicle.

Another important object is to provide such a triple axle spring suspension consisting of compact units which are arranged so as not to interfere with the frame, axle and wheel movement and in which the moving parts are arranged immediately inside and close to the wheels and are high to provide high and wide support for the body on the axles with resulting increased stability.

Another important object is to provide such a triple axle suspension in which all of the axles are self-steering so that in rounding a curve the axles automatically assume such position relative to each other as will enable a pure rolling action to be obtained. This object is also achieved on the straightaway when some imbalance, such as one tire being of greater diameter, tends to cause tire scuffing.

Another object is to provide such a suspension in which the vertical resilience is provided by helical compression springs and which suspension can be removed and replaced, with the three axles, walking beams and wheels as a unit, so that field repairs can be avoided and the hold-up of trucks for repairs of their suspensions can be reduced to a minimum.

Another object is to provide such a triple axle suspension which can have softer springs than those now on the market for equivalent duty and at the same time have greater sidesway control through high and wide spring mountings.

Another aim is to provide reduced height change of the body from the ground, from empty to loaded, preferably keeping this change to a few inches and at the same time providing a soft, low frequency ride with improved stability and sidesway control.

Another object is to provide such a triple axle suspension which can have many years and hundreds of thousands of miles of carefree operation without repairs or service and in which tire mileage in the order of 250,000 miles can be expected.

Another object of the present invention is to provide such a suspension in which the principal bearings are free from lubrication or service requirements and dependable for years of carefree service, this being achieved by making such a suspension in which all the bearings, other than the wheel bearings and a lateral movement control roller, are in the form of rubber bodies, such as bushings or cushions, which are torsionally distorted to provide the required movement of the connected parts.

Another object of the invention is to provide such rubber bushings, particularly for the walking beams of the suspension, which are low in cost and in which the rubber is confined in such manner as to give optimum performance with maximum life. Such rubber bushings also permit lateral movement of the ends of the walking beams but at the same time yieldingly return the walking beams to centered position.

Another object of the invention to provide in combination with such rubber bushings for the walking beams, positive stops limiting displacement of the ends of the walking beams.

Another object of the invention is to provide such a triple axle suspension which is light in weight, this being achieved principally by a light weight bolster interposed between one axle and walking beam structure and which incorporates the strength of the cross rod on which the walking beam structure is journalled, and also provides widely spaced high spring seats for vertically disposed helical compression springs which provide the vertical resiliency.

Another object is to provide such a triple axle suspension which is low in both initial cost and upkeep; which renders auxiliary devices for the control of sidesway unnecessary; and in which periodic vibration of the suspension is dampened out.

Other objects and advantages of the invention will be apparent from the following description and drawings in which:

FIG. 4 is an enlarged fragmentary vertical longitudinal section taken generally on line 4—4, FIG. 2;

FIG. 5 is an enlarged fragmentary vertical section taken generally along line 5—5, FIG. 2;

Figure 1:
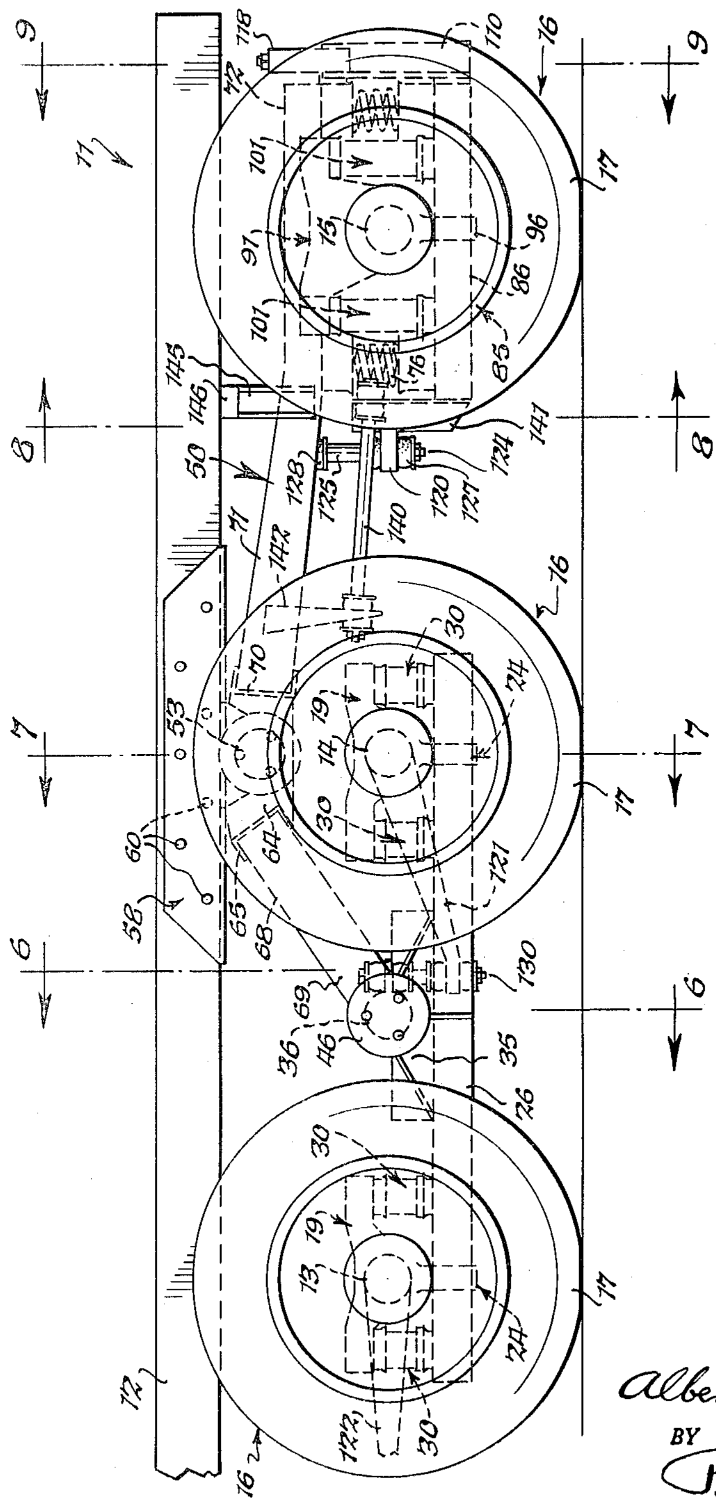
FIG. 1 is a fragmentary side elevational view of the rear end of a triple axle vehicle having a suspension embodying the invention, the parts being shown in empty body position.

The invention is illustrated as being in the form of a triple axle suspension for heavy duty trucks or trailers. The main frame 11 of the truck or trailer can be of any suitable construction and is shown as comprising a pair of main longitudinal side frame bars in the form of inwardly opening channels 12 which are shown as straight and parallel and connected by the usual cross bars (not shown). The frame is supported by a first or forward axle 13, a second or center axle 14 and a rear or third axle 15. These axles are in turn shown as supported by dual wheels 16, these wheels including tires 17. One or all groups of these wheels can be drive wheels.

The construction of the triple axle suspension at the right hand side of the suspension is substantially the same as the triple axle suspension of the left hand side of the truck and hence the following description of one side of the truck will be deemed to apply to both sides, the same reference numerals being used. Each end of each of the front pair of axles 13 and 14 is embraced by a rubber sleeve 18 of substantial thickness. Each of these rubber sleeves is embraced by the semicylindrical bottom face of the body part 19 of an axle bracket indicated generally at 20 and by a companion semicylindrical bottom clamping member 21. Each rubber bushing 18 is held against longitudinal displacement on its axle 13 or 14 by rings or outwardly extending flanges 22 and each bottom clamping member 21 can be secured to the body part 19 of its axle bracket 20 by bolts 23 which serve to draw each axle bracket body part and its semicylindrical bottom clamping member into compressive relation with the rubber bushing 18 to hold the axle bracket 20 against rotation relative to its axle 13 or 14 except to the limited degree permitted by torsional twisting of the rubber sleeve 18. Each bottom clamping member 21 also has welded to its bottom a bracket 24, this bracket having a downwardly projecting bumper or stop flange 25, this flange extending with its broad vertical face lengthwise of the line of movement of the truck and in closely spaced relation to the inside vertical face of a corresponding secondary tubular walking beam 26 and serving to prevent undue sidewise movement (relative to the line of travel of the truck) of the axles 13 or 14 relative to these secondary walking beams 26.

The body part 19 of each axle bracket 20 has opposite arms projecting fore-and-aft with reference to the vehicle. Each arm is T-shaped in cross section having a vertical web 27 and a top plate 28, the latter extending the ful length of the axle bracket. Each vertical web 27 is angularly disposed to toe in or converge toward the front and center of the vehicle. To one face of each toed-in vertical web 27 is secured, as by bolts 29, the upper end of a leaf spring shackle 30, these leaf spring shackles thereby also toeing in or converging toward the front and center of the vehicle.

These leaf spring shackles and their mountings form the subject of my copending application Serial No. 91,101, filed February 23, 1961, for Tandem Axle Spring Suspension, now Patent No. 3,129,053, dated April 21, 1964, and to which reference is made for a more complete description thereof. In general, however, each of the leaf spring shackles comprises a group of central flat spring leaves flanked at each end and on each side by a pair of shorter spring leaves, and the bolts 29 extend through the upper end of these spring leaves and anchor in the toed-in vertical webs 27 of the axle brackets 20.

Figure 7:
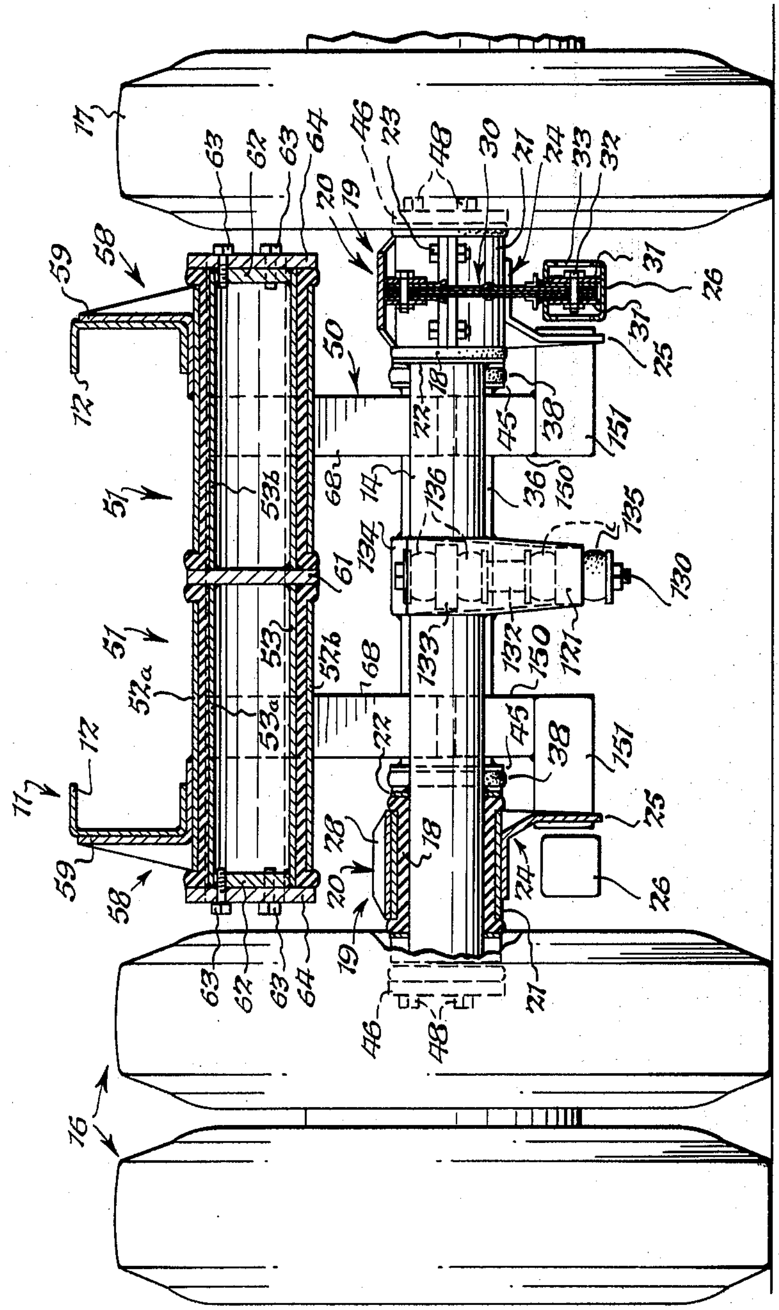

The lower end of each leaf spring shackle 30 extends through a hole in the top of each end of each of the secondary walking beams 26 into the interior thereof and, as described in greater detail in my said patent, fits between a pair of vertically spaced webs 31 welded on the inside of each end of each secondary walking beam 26 as best shown at the right of FIG. 7. Bolts 32 extend through and clamp the lower ends of the leaf spring shackles 30 between the webs 31, access to these bolts being had through access holes 33 at each end of each of the walking beams 26. These leaf spring shackles 30 are of relatively short effective length, say in the order of seven inches, as compared with the leaf spring shackles to be later described for the third or rear axle 15. The leaf spring shackles 30 are arranged adjacent the inner faces of the tires 17 of the innermost wheels 16 for the axles 13, 14, and the secondary walking beams 26 are arranged principally below the space between these tires and the adjacent main longitudinal side frame bars 12.

Figure 2:
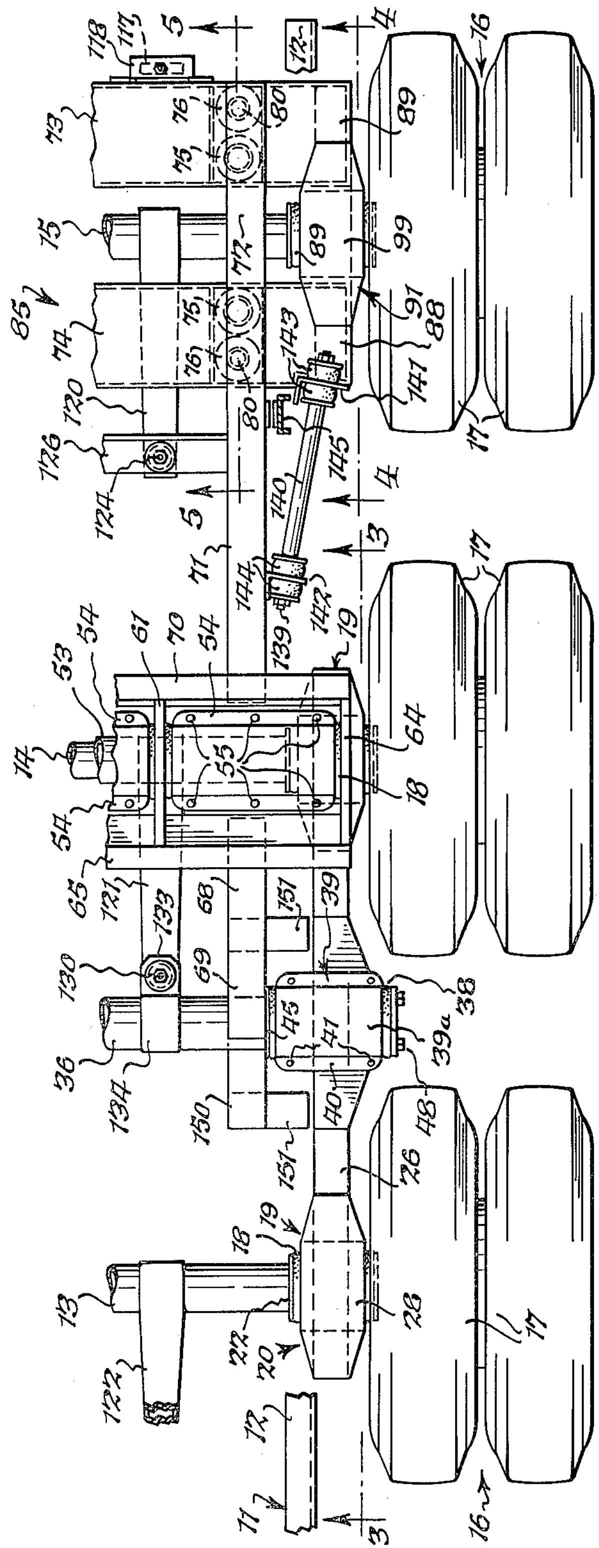
FIG. 2 is a fragmentary top plan view, with parts broken away, of one side of the suspension shown in FIG. 1, the other side of the suspension being of substantially identical construction.
Figure 6:
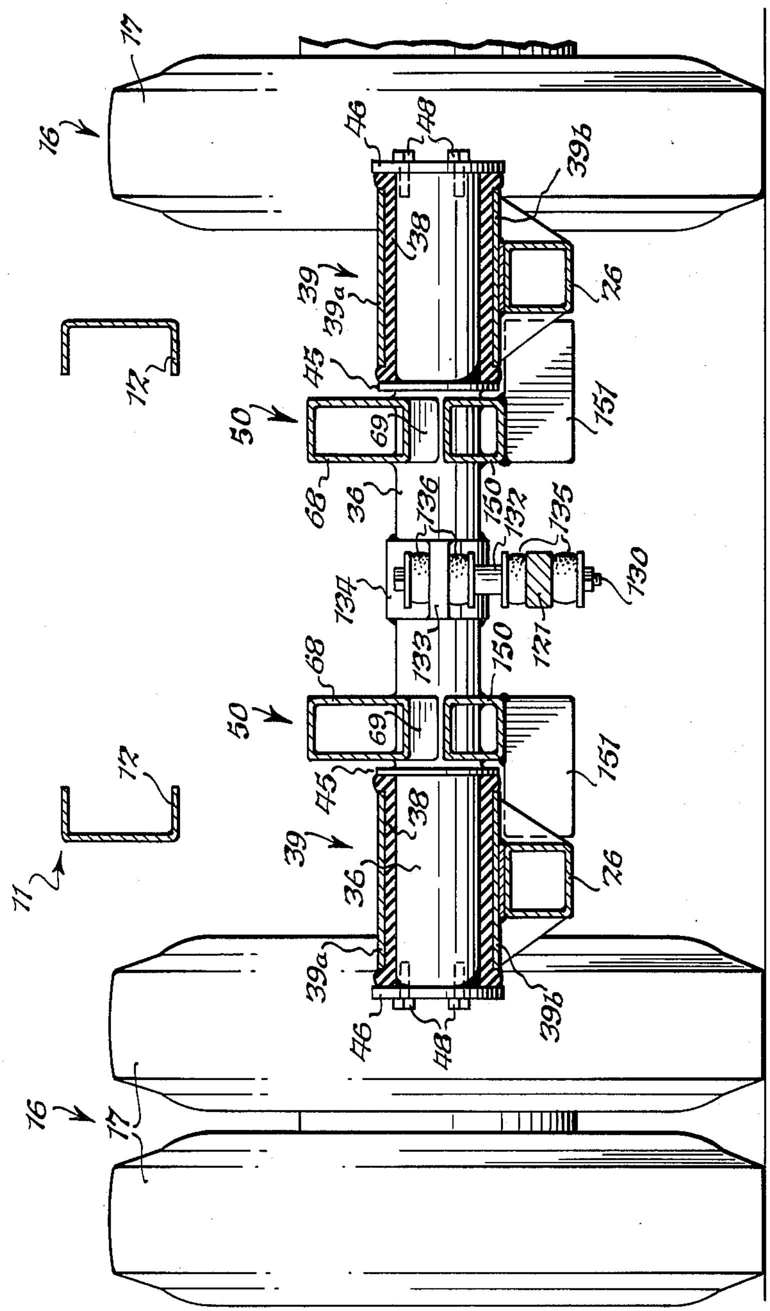
FIGS. 6, 7, 8 and 9 are enlarged vertical transverse sections, partly in elevation, taken along the correspondingly numbered lines of FIG. 1.

Each secondary walking beam 26 is preferably of tubular or box form in vertical cross section having side walls and horizontal top walls as best shown in FIGS. 6 and 7. The central part of each walking beam 26 preferably arches up as indicated at 35 and is journalled on a cross rod or tube 36 by means of a rubber bushed bearing 38 of which is under compression and is of substantial thickness to be deformed or twisted torsionally as a part of the bearing movement in yieldingly permitting the necessary rocking movement of each secondary walking beam 26. Each rubber bushing 38, as best shown in FIGS. 2 and 6, embraces the corresponding end of the cross rod or tube 36 and is held in compressive relation therewith by the semicylindrical halves **39*a* and 39*b* of a two-piece rock sleeve 39. The two halves 39*a* and 39*b* have axially extending outwardly projecting horizontal flanges 40 which are drawn together by bolts 41 to provide the desired degree of compression of the rubber bushing 38. The lower half 39*b* of each rock sleeve 39 is suitably welded in the center of the upwardly projecting central part 35 of the corresponding secondary walking beam 26**.

To permit the flow of rubber necessarily resulting from the movement of the secondary walking beams 26, as well as to accommodate the rubber displaced or tightening the bolts 41 to obtain the required precompression of the rubber bushings 38, the ends of the rubber bushings project beyond the ends of the two part rock sleeves 39 and are somewhat enlarged or bulging as shown.

Each secondary walking beam 26 is yieldingly held against inward axial displacement along the cross rod or tube 36 by an abutment ring or collar 45 surrounding and welded to the cross tube 36, and each secondary walking beam 26 is yieldingly held against outward axial displacement from this cross tube 36 by a circular end head or disk 46 secured to the corresponding end of the cross rod or tube 36 by screws 48 or in any other suitable manner.

Figure 3:
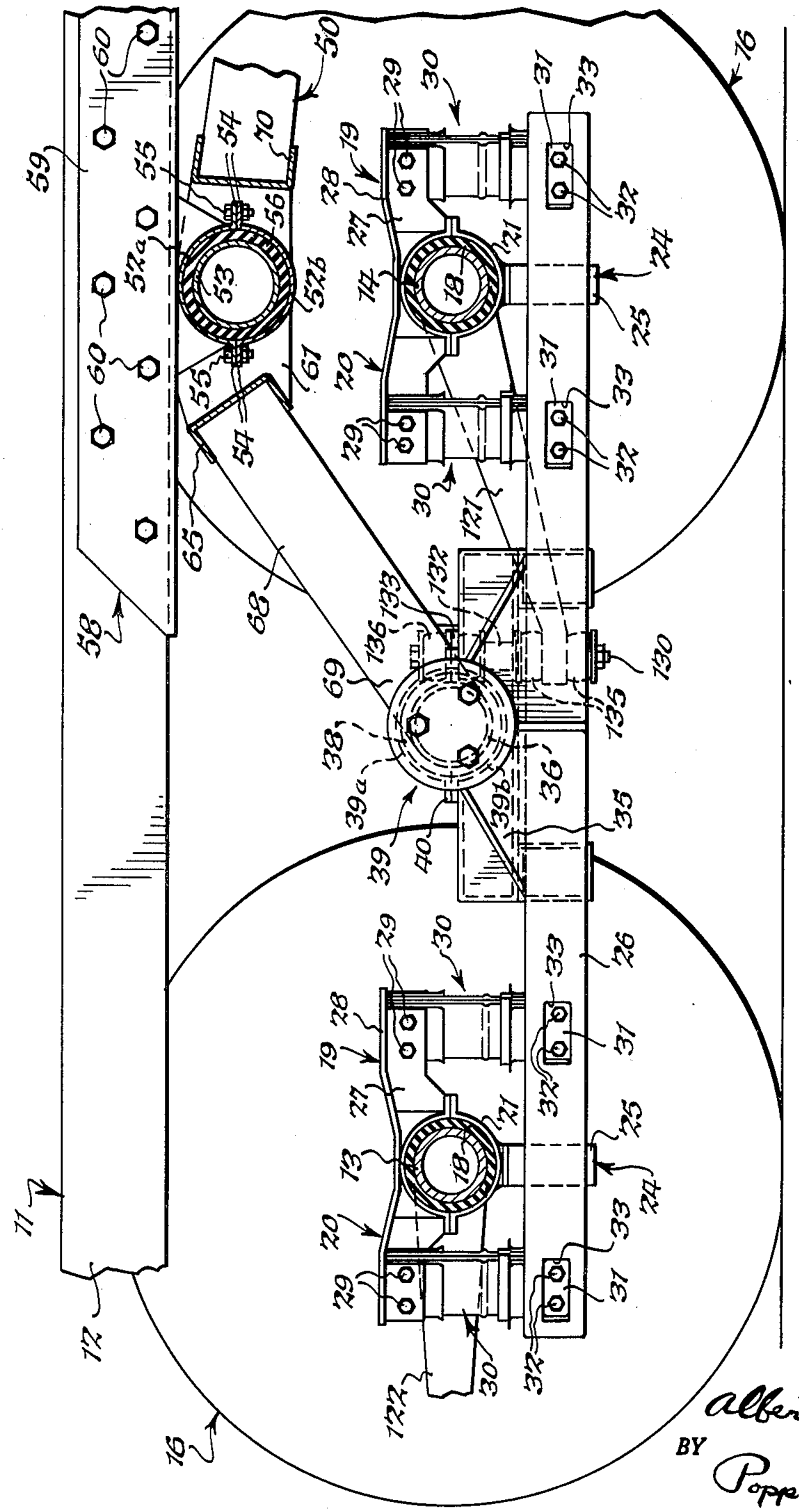
FIG. 3 is an enlarged fragmentary vertical longitudinal section taken generally along line 3—3, FIG. 2, the parts again being shown in empty body position.

An important feature of the invention resides in the provision of a main walking beam 50 for distributing the load between the forward pair of tandem axles 13, 14 and the rear tandem axle 15. This main walking beam 50 is journalled at its center in coaxial horizontal frame bearings 51 arranged above and parallel with the central axle 14, the construction of these frame bearings 51 and main walking beam 50 being as follows:

The numerals **52*a* and 52*b* represent, respectively, the upper and lower halves of a bearing sleeve embracing the opposite ends of a cross rock shaft 53, these bearing sleeve halves having mating axially and radially outwardly extending flanges 54 which are bolted together as indicated at 55, FIGS. 2, 3 and 4. Each pair of these bearing sleeve halves 52*a*, 52*b* compressively embraces a rubber bushing 56 and holds the same in compressive engagement with the periphery of the corresponding end of the cross rock shaft 53**.

Each pair of coaxial bearing sleeve halves **52*a*, 52*b* can be fixed to the corresponding main longitudinal side frame beam 12 in any suitable manner, each upper half bearing sleeve 52*a* being shown for this purpose as being welded to a bracket 58 as shown in FIG. 7 and which bracket has an upstanding flange 59 secured by bolts 60, FIGS. 1, 3 and 4, to the outer vertical face of the corresponding main longitudinal side frame beam 12**.

The cross rock shaft 53 is preferably made of two coaxial sections 53*a*, 53*b* having their opposing ends welded to a heavy plate or block 61 which extends forwardly and rearwardly from the cross rock shaft. Also in the outer end of each cross rock shaft section 52*a* and 52*b* is welded an end head or disk 62 to the outer face of which is secured, as by screws 63, a heavy end plate or block 64 which extends forwardly and rearwardly from the cross rock shaft.

To the forward edges of these heavy plates 61, 64 so welded to the center and ends of the cross rock shaft 53 is welded the upwardly and forwardly inclined rear face of a cross bar 65 which is channel-shaped in cross section, its channel facing downwardly and rearwardly toward the cross rod or tube 36 as best shown in FIGS. 1, 2 and 3. In this channel, at each end of the cross bar 65, is welded the upper rear end of a tube 68 which is rectangular in cross section and the lower front end 69 of which conforms and its fitted and welded to the upper and forward peripheral face of the cross rod or tube 36 as shown in FIGS. 1, 2.

To the rearward edges of these heavy plates 61, 64 so welded to the center and ends of the cross rock shaft 53 is welded the back face of a cross bar 70 which is channel-shaped in cross section, its channel facing rearwardly as shown in FIGS. 1, 2, 3 and 4. In this channel, at each end of the cross bar 70, is welded the upper front end of a tube 71 which is of rectangular form in cross section, and the lower rear end portion 72 of which is in the form of a horizontal portion extending over the ends of the rear axle 15 as shown in FIGS. 1, 2, 4, 5, 8 and 9.

To the extreme rear ends of these rear horizontal portions 72 of the main walking beam 50 is welded a downwardly opening horizontal cross channel 73, and to the extreme front ends of these rear horizontal portions is welded a downwardly opening horizontal cross channel 74. These cross channels 73, 74 are parallel and identical in construction and bridge the space between the rear horizontal portions 72 of the main walking beam 50 and each end of each of these cross channels is adapted to be supported on the upper ends of a pair of light and heavy duty helical compression springs 75, 76. Each pair of springs are arranged in fore-and-aft relation to each other and to the spring 75 of each pair, as best shown in FIG. 5, is a light duty spring in constant contact with its cross channel 73 or 74 while the other spring 76 of each pair is a heavy duty spring which is spaced from its cross channel 73 or 74 when the chassis frame is unloaded and only comes into service when a load is carried by the chassis. By this light and heavy duty spring arrangement it will be seen that the light duty springs 75 are in constant service, especially when the truck is empty and hence supported only on the light duty springs to provide a desirable empty body ride, whereas the heavy duty springs 76 cut into service only when the truck is loaded to provide adequate spring support for the load.

Each pair of springs is seated on the corresponding end of an upwardly opening cross channel, the cross channel under the downwardly opening cross channel 73 being designated at 78 and the cross channel under the downwardly opening cross channel 74 being designated at 79. The light duty constant contact springs 75 can be held in position in the opposing channels 73, 78 and 74, 79 in any suitable manner (not shown) but the heavy duty springs 76 are shown as each retained in place by opposing pins 80, 81 which prevent these springs from jumping out of position when unloaded as illustrated in FIG. 5.

The two spring supporting, upwardly opening channels 78, 79 are supported by an axle supported bolster, indicated generally at 85. This bolster is shown as composed of a pair of side bars 86, which are of rectangular tubular form in cross section, rigidly connected, as by welding, at their front and rear ends by front and rear cross bars 88, 89. The bolster 85 is preferably wider than the chassis 11, and for this purpose, the side bars 86 of this bolster are located directly below the space between the main longitudinal side frame beams 12 and the inside tires 17 of the wheels of the rearmost axle 15 as best shown in FIG. 8.

Each end of the axle 15 is embraced by a rubber sleeve 89 of substantial thickness. Each of these rubber sleeves is embraced by the semicylindrical bottom face of the central body part 90 of an axle bracket indicated generally at 91 and by a companion semicylindrical bottom clamping member 92. Each rubber bushing 89 is held against longitudinal displacement on the axle 15 by rings or outwardly extending annular flanges 93 and the bottom clamping member 92 can be secured to the body part 90 of the axle bracket 91 by bolts 94 which serve to draw each axle bracket body part and its semicylindrical bottom clamping member into compressive relation with the corresponding rubber bushing 80 to hold the axle bracket 91 against rotation relative to its axle 15 except to the limited degree permitted by the torsional twisting of the rubber sleeve 89. Each clamping member 92 also has welded to its bottom a bracket 95, this bracket having a downwardly projecting bumper or stop flange 96, this flange extending with its broad vertical face lengthwise of the line of movement of the truck and in closely spaced relation to the inside vertical face of the corresponding side bar 86 of the bolster and serving to prevent undue sidewise movement (relative to the line of travel of the truck) of the bolster 85 relative to the rearmost axle 15.

Figure 8:
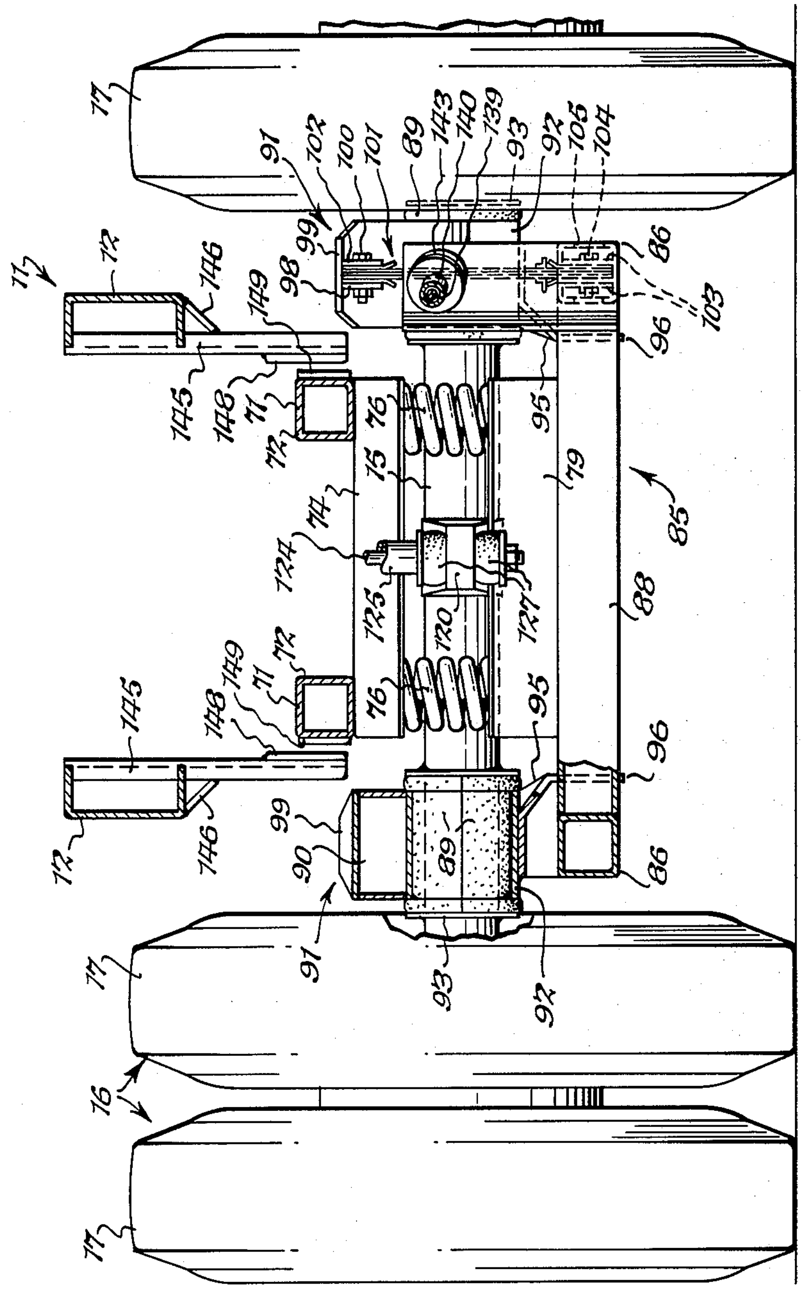

The central body part 90 of each axle bracket 91 is of rectangular box-like form in vertical and horizontal section, as best shown in FIGS. 2 and 8 and has opposite arms projecting fore-and-aft with reference to the vehicle. Each arm is T-shaped in cross section having a vertical web 98 and a top plate 99, the latter extending over both the arms as well as the central box-like body part 90. Each vertical web 98 is angularly disposed to toe in or converge toward the front and center of the vehicle. To one side face of each toed-in vertical web 98 is secured, as by bolts 100, the upper end of a leaf spring shackle 101, these leaf spring shackles thereby also toeing in or converging toward the front and center of the vehicle.

These leaf spring shackles and their mountings form the subject of my said Patent Number 3,129,053, dated April 21, 1964 and to which reference is made for a more complete description thereof. In general, however, each of the leaf spring shackles 101 comprises a group of central flat spring leaves flanked at each end and on each side by a pair of shorter spring leaves, and the bolts 100 extend through the upper end of these spring leaves and a clamping plate 102 and anchor in the toed in vertical webs 98 of the axle brackets 91.

The lower end of each leaf spring shackle 101 extends through a hole in the top wall of each side bar 86 of the bolster 85 into the interior thereof and, as described in greater detail in my said patent, fits between a pair of vertically spaced webs 103 welded inside of each bolster side bar 86 as indicated by dotted lines at the right of FIG. 8. Bolts 104 extend through and clamp the lower ends of the leaf spring shackles 101 between the webs 103, access to these bolts being had through access holes 105 in the sides of the bolster side bars 86.

Figure 10:
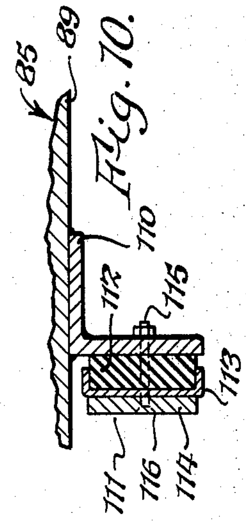
FIG. 10 is a further enlarged fragmentary horizontal section taken generally along line 10—10, FIG. 9.

It is important that the bolster 85 be maintained in substantially centered relation to the rear end of the walking beam 50 but that this restraint be of a yielding nature. To this end a pair of spaced upstanding rails 110, which are preferably of L-shaped form in cross section, as best shown in FIG. 10, are welded at their lower ends to the rear face of the rear cross bar 89 of the bolster 85, these rails providing opposed parallel faces 111 which are in spaced relation to each other and lie in vertical planes parallel with the line of movement of the vehicle. Each of these faces 111 is faced with a strip 112 of rubber or other soft resilient yielding material, and which strip is embraced by a vertical channel bar 113 to the exterior vertical face of which is secured a wear plate 114 by means of bolts 115. These wear plates have their vertical working faces 116 in parallel spaced relation to each other and are adapted to engage the periphery of a wheel 117 interposed therebetween. This wheel can be suitably journalled on the rear or trailing side wall of the rear vertical cross channel 73 of the walking beam 71.

In addition a bridge piece 118 connects the upper ends of the two vertical rails 110 and this bridge piece carries a downwardly directed bumper 119 at its center. This bumper is arranged to engage the top of a bracket 120 suitably secured to the rear vertical cross channel 73 of the main walking beam 50 in position to be in the path of the bumper 119 during relative vertical movement of the bolster 85 with reference to the rear end of the walking beam 50.

The suspension is also shown as including torque arms 120, 121 and 122 which are effective against brake and drive torque reactions of each axle. Each of these torque arms 120, 121, 122 is welded to the corresponding axle 15, 14 and 13, respectively, near the center thereof to project horizontally toward the front end of the vehicle. The torque arm 120 of the rearmost tandem axle 15 can be connected by a vertical rod 124 and spacer tube 125 to a cross angle bar 126 of the main walking beam 71. Preferably the vertical force of this torque arm 120 is transmitted through a pair of rubber bushings 127 to the vertical rod 124 and spacer 125 and the vertical force of this rod and spacer is directed to the cross angle bar 126 through a pair of rubber cushions 128.

In like manner the torque arm 121 of the intermediate axle 14 can be connected by a vertical rod 130 and spacer tube 132 to a flange 133 projecting horizontally rearwardly from a sleeve 134 welded to the center of the cross rod or tube 36 (FIGS. 2 and 6). Preferably the vertical force of this torque arm 121 is transmitted through a pair of rubber bushings 135 to the vertical rod 130 and spacer 132 and the vertical force of this rod and spacer is transmitted to the flange 133 of the welded sleeve 134 through a pair of rubber cushions 136.

The outboard end of the forward torque arm 122 can be pivotally connected to the frame 11 in the same manner (not shown).

Radius rods 139 and spacer tubes 140 are provided to prevent any substantial horizontal movement of the bolster 85 longitudinally of the vehicle frame while at the same time permitting free vertical movement thereof relative to the vehicle frame. Each of these radius rods extends horizontally forwardly from an upstanding angle bar 141 welded to the forward end of the corresponding bolster side bar 86 to a depending angle bar 142 welded to the corresponding tube 71 of the main walking beam 50 as best shown in FIG. 4. Also as shown in this figure, the horizontal force, force-and-aft of the vehicle, is transmitted from the ends of the bolster 85 to the radius rods 139 and spacers 140 through a pair of rubber cushions 143 and from these radius rods 139 and spacers 140 to the main walking beam 50 through a pair of rubber cushions 144. Preferably these radius rods toe in toward the front of the chassis, as best shown in FIG. 2.

To prevent so called jack-knifing, it is desirable to prevent undue movement of the rear end of the main walking beam 50 with reference to the frame 11 transversely of the line of movement thereof. To this end, each main longitudinal side bar 12 of the chassis frame 11 is shown as having welded thereto a depending channel bar 145 the lower end of which is arranged alongside outside vertical face of the rear end portion 72 of the corresponding side bar 71 of the main walking beam 50 as best shown in FIGS. 4 and 8. This bar can be strengthened by a bracket 146. At its lower end each of these depending channel bars 145 can be provided with a vertical wear plate 148 adapted to engage a vertical wear plate 149 fixed to the outside vertical face of the main walking beam 50.

To limit horizontal movement of each end of each of the secondary walking beams 26 laterally of the vehicle frame 11, arms 150 are shown as welded to each end of the cross tube 36 to extend both forwardly and rearwardly therefrom, and a stop 151 protrudes laterally from the end of each of these arms toward the side of the corresponding secondary walking beam 26, as best shown in in FIGS. 2, 6 and 7.

*Operation*

In the operation of the suspension, the upward movement of one end, say of the foremost tandem axle 13, effects upward movement of the double armed axle bracket 19 fixed thereon thereby to place the corresponding pair of leaf spring shackles 30 under tension to effect upward movement of the front end of the corresponding secondary walking beam 26.

This upward movement of the forward end of one secondary walking beam 26 raises its rock sleeve 39 (FIGS. 2 and 6) at the center of the secondary walking beam and which is journalled through the rubber bushing 38 on the corresponding end of the cross tube 36. This rubber bushing is of sufficient radial thickness to permit the required rocking of the secondary walking beam 26 and provides a frictionless bearing which is free from lubrication requirements. The two rubber bushings 38 hold the two secondary walking beams 26 properly positioned at the outer ends of the cross tube 36 and also return the ends of the secondary walking beams to horizontally centered position transverse of the line of movement of the vehicle, but at the same time permit limited movement of the secondary walking beams lengthwise of the cross tube 36 and also permit the movement of the ends of the two secondary walking beams 36 toward and from each other to yieldingly conform to service requirements.

The degree of this last movement, namely, the movement of the opposite ends of the two walking beams 26 toward and from each other is, however, limited by the stops 151 protruding from the arms 150 which arms are welded to and project forwardly and rearwardly from the opposite ends of the cross tube 36.

This cross tube 36 forms the forward cross member of the main walking beam structure or rigid frame and for this purpose is welded to the forward ends of the main walking beams 50. Accordingly this upward movement of either end of either secondary walking beam 26 effects upward movement of the cross tube 36 and accordingly effects upward movement of the forwardly projecting arms 68 of the main walking beams 50. This effects upward movement of the front and rear cross channels 65, 70 (FIGS. 1, 2 and 3) as well as the center plates 61 and 64 welded to and connecting these cross channels of the main walking beam structure. This in turn raises the sections 53*a* and 53*b* of the cross tube 53 and which is journalled through the rubber bushings 56 in the bearing sleeves 52*a*, 52*b* which are fixed to the vehicle frame 11 by the frame brackets 58. This rubber bushing 56 is of sufficient radial thickness to permit the required rocking of the main walking beams 50 and provide frictionless bearings which are free from lubrication requirements.

The resistance of the vehicle frame 11 to such assumed upward movement of the cross tube 53 is translated into a downward movement of the rear ends of the rear arms 71 of the main walking beams 50 so as to transfer a proportionate part of the increased load created by the assumed upward movement of one end of the front axle 13 to the rear end of the main walking beams 50. This downward movement of the rear ends 72 of the main walking beams 50 is transmitted through the cross channels 73 and helical compression springs 75, 76 to the bolster 85. This downward force against the bolster 85 is resisted by the four sets of leaf spring shackles 101, this force being transferred to the opposite fore-and-aft ends of the double armed axle brackets 91 fixed to the opposite ends of the rearmost axle 15.

It will accordingly be seen that the load carried by the three axles 13, 14 and 15 is transferred from the rear axle 15 to the front pair of axles 13 and 14 via the main walking beams 50 through the bolster 85 and helical compression springs 75, 76, the latter essentially providing the resilient support for the loaded chassis 11 upon the three axles 13, 14 and 15. It will further be seen that the load on the foremost axle 13 is transferred to the intermediate axle 14, and vice versa, via the secondary walking beams 26 journalled at the forward ends of the main walking beams 50.

Since the body is journalled on the main walking beams 50 through the rubber bushings 56, and since the forward ends of the main walking beams 50 are journalled on the secondary walking beams 26 through the rubber bushings 38 and since the opposite ends of the secondary walking beams 26 are journalled on the foremost and intermediate axles 13, 14 through the rubber bushings 18, it will be seen that except for the wheel bearings themselves, the vehicle is supported on friction free bearings free from lubrication requirements and which not only permit the necessary rocking movement of the main walking beams 50 and the secondary walking beams 26 but also provide a limited cushioning of the horizontal movement of the vehicle frame 11 lengthwise of its line of travel as well as transversely of its line of travel.

It will also be seen that the resilient resistance so provided by the helical compression springs 75, 76 in supporting the chassis 11 upon the three axles 13, 14 and 15 is in the form of two stage springing. Thus, when the body or chassis 11 is empty the resilient resistance is provided exclusively through the two pairs of light duty helical compression springs 75 and at this time the heavy duty helical compression springs 76 are completely out of service as illustrated in FIG. 5. Accordingly a desirable low frequency empty body ride is provided for the chassis 11 by virtue of its being supported exclusively by a small number of relatively light helical compression springs 75. When a load is applied to the body, however, the main walking beams 50 are forced downwardly so as to cause their rear ends to engage and be supported by the tops of the heavy duty helical compression springs 76. By cutting the two pairs of heavy duty helical compression springs 76 into service (see FIG. 5) it will be seen that increased resilient support is provided for the load and that by proper selection of the characteristics of the light duty and heavy duty helical compression springs 75, 76 now supporting the load a desirable low frequency ride can be provided for the loaded vehicle.

Lateral cushioning of the three axles 13, 14 and 15 is provided by the leaf spring shackles 30 and 101. Thus any of the three axles can move lengthwise of its axis, this being permitted by the leaves of these leaf spring shackles and these leaf-spring shackles yieldingly return the chassis 11 to centered relationship to the axles when normal conditions are restored. It will be noted that since the leaf spring shackles are between the axles and the walking beams, there is minimum inertia resistance to such lateral movement of the axles, the only inertia being that of the individual axles themselves.

An important feature of the suspension is that the axles 12, 13, 14 and 15 are also self-steering, that is, they move laterally to trail the steering wheels (not shown) and to trail each other as the vehicle is steered around curves and in and out of traffic. This self-steering is obtained through the angularity, in a horizontal direction, of the leaf spring shackles 30 and 101. Thus the leaves of these leaf spring shackles toe in or converge toward the front of the vehicle, the leaves of the leaf spring shackles at each side of the vehicle being parallel.

When the vehicle makes a turn in the road, the tires of each of the axles 13, 14 and 15 tend to resist the scuffing which would otherwise occur and in doing so push each axle endwise laterally of the frame 11 to eliminate such scuffing. Confining attention to the front axle 13, this lateral or axial movement on making a turn displaces the upper ends of its four pairs of leaf spring shackles 30 horizontally, these leaf spring shackles at one side of the vehicle being displaced horizontally toward the frame 11 and at the other side of the vehicle being displaced away from the frame. Since these shackles 30 are set at an angle and since the shackles at the opposite sides of the vehicle are set at opposite angles in a horizontal direction so that the leaves of all the shackles toe in toward the front of the vehicle, it will be seen that such assumed movement of the front axle 13 lengthwise of its axis causes one of its ends to be displaced forwardly and its other end to be displaced rearwardly with reference to the line of travel of the vehicle.

It will therefore be seen that such axial displacement of each tandem axle 13, 14, 15 will cause a corresponding displacement, fore-and-aft of the frame 11 of the opposite ends thereof. This fore-and-aft displacement of the three axles 13, 14 and 15 is such that in rounding a curve and with such endwise displacement of these axles 13, 14, 15 to avoid tire scuffing, all three of the axles are caused to steer in the direction corresponding to the turn being made by the vehicle.

Thus, when the vehicle is steered to the right, the front end of the frame 25 moves about a vertical pivot which can be assumed to intersect the axis of the intermediate axle 14. This causes a lateral movement of the body 11 in opposite directions relative to the axles 13 and 15, the body movement being to the right relative to the foremost tandem axle 13 and to the left relative to the rearmost tandem axle 15. This causes the lefthand end of the front foremost tandem axle 13 to move forwardly and the righthand end of this foremost tandem axle to move rearwardly. This also causes the lefthand end of the rearmost tandem axle 15 to move rearwardly and the righthand end of the rear tandem axle to move forwardly. The movement therefore tends to bring the axes of the foremost and rearmost tandem axles 13, 15 so as to intersect the axis of the front steering wheels (not shown) as well as the axis of the intermediate axle 14, and thereby enable the truck to make the turn without tire scuffing. If, of course the theoretical vertical pivot axis of the truck frame 11 in turning does not exactly coincide with the axis of the intermediate axle 14, the opposite ends of this axle will also move forwardly or rearwardly to join the rest of the axles in steering around the curve. Equally important is that the self-steering feature tends to hold the wheels in perfect alinement when travelling straight ahead. This self-steering action also takes place to some extent when a tendency to tire scuffing occurs because of one wheel or a pair of wheels having a different diameter from the diameter of the wheel or pair of wheels at the other side of the same axle.

To restrain the unsprung components of the rearmost axle 15 against movement fore-and-aft of the vehicle and at the same time provide a limited resilient resistance to such movement, the radius rods 140 are provided at each side of the vehicle. These radius rods extend lengthwise of the line of movement of the vehicle and each is connected at one end, through rubber bushings 143, to an upstanding angle at the corresponding side of the bolster 85 and at its opposite ends to an angle 142 depending from the corresponding main walking beam 50, rubber cushions 144 being interposed between these parts. It will therefore be seen that the movement of the unsprung components of the rearmost axle 15 fore-and-aft of the vehicle frame 11 is limited by these radius rods 140 but that the rubber bushings 143, 144 provide a degree of resilient resistance to this limiting action.

Figure 9:
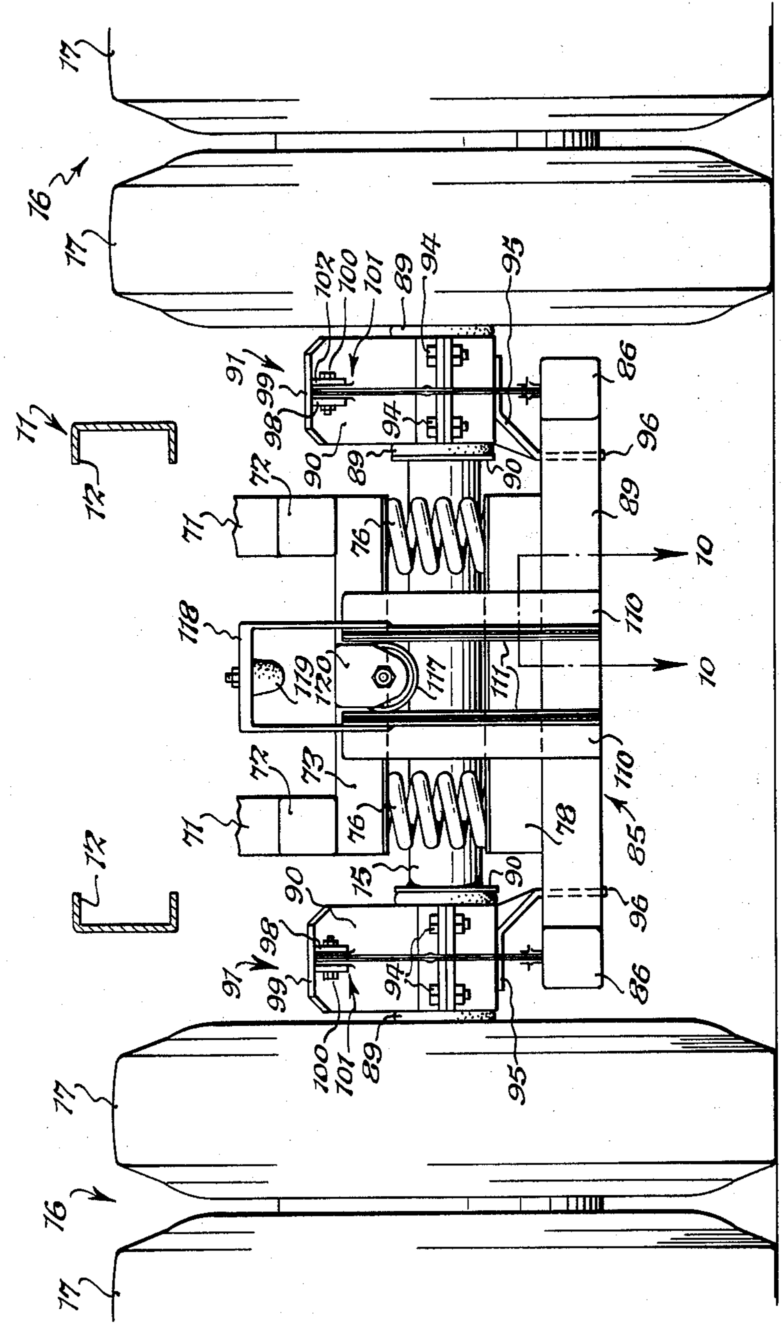

In similar manner, movement of the unsprung components of the rearmost axle 15 transversely of the rear end of the main walking beam structure is resisted by the roller 117, FIGS. 9 and 10, in such manner as to cushion this restraining action. Thus this roller 117 is journalled on the rear end of the main walking beam structure and works between the two upright rails 110 so as to prevent undue movement of the bolster 86 transversely of the line of movement of the frame 11 under all load conditions. At the same time the actual engagement of the roller 117 is with the wear plates 114 having the rubber backing blocks 112 interposed between them and the rails 110. Accordingly this roller 117 restrains the bolster 85 against movement laterally of the line of travel of the vehicle frame 11 but in a cushioned manner.

The torque arms 120, 121, 122 fixed respectively to the axles 15, 14 and 13 adequately resist all brake and drive torque reactions and through the rod and rubber cushions 124–128 and 130–136 do not resist axle movement in any direction other than turning about its own axis.

The rubber bushings 18, 38, 56 and 89 constitute an important feature of the suspension, these rubber bushings being thick enough to wind up or flex torsionally in response to the oscillation of the walking beams, and this wind up or torsional stress in addition contributing to holding all six groups of wheels, and hence the unsprung weight of the suspension, on the road, particularly when travelling along without a load and at high speeds. A serious problem with heavy vehicles, when unladen, is to keep the wheels of the triple axles on the road at high speeds. Often the unsprung weight is as great or greater than the sprung weight and under such conditions the main spring means between the triple axle suspension as a whole and the vehicle frame are less effective in keeping the wheels, particularly individual wheels, on the road. The torsionally flexed rubber bushings 18, 38, 56 and 89 utilize the weight of the unsprung mass of the vehicle to hold the wheels on the road. This is accomplished, for example, by the stressed rubber bushings 38, for example, as follows when travelling unladen at high speed.

When one or two pairs of wheels carrying the axle 13, 14, rise, both rubber bushings 38 are flexed or twisted against their internal resistance, and hence the upward movement of the rising wheels not only is not accelerated but instead is resiliently resisted by the bushings and the reactive forces tends to return the rising wheel to contact with the road. These rubber bushings 38 are a part of the unsprung mass and hence this resistance and reactive force of the rubber bushings is a function of the unsprung mass and is independent of both the main vertical cushioning springs 75, 76 and also the sprung mass which, as pointed out above, can be of very reduced effectiveness in holding these wheels on the road. In similar manner the stressing of the rubber bushing 56 for the main walking beams 50 tends to hold the wheels supporting the rearmost axle 15 on the ground.

Undue lateral movement of the rear ends 72 of the main walking beams 50 is limited by the wear plates 148, 149, FIG. 8, interposed between the sides of these rear ends of the main walking beams 50 and the bearings 145 depending from the sides of the frame 11.

By "rubber" as used in the accompanying claims is meant natural rubber, synthetic rubber or mixtures of natural and synthetic rubber.

It will be seen that the triple axle suspension of the present invention is adapted to be interposed between the vehicle frame 11 and three axles 13, 14, 15 each having rubber tired wheels 16, 17 at the ends thereof and comprises a main walking beam 50 arranged at each side of the frame 11 and extending lengthwise thereof, a first journal means 51, 53 supporting the vehicle frame 11 on each main walking beam 50 intermediate the ends of the latter for oscillation of each main walking beam 50 about a generally horizontal axis extending transversely of the frame 11, a second journal means 75–92 supporting one end 72 of each main walking beam 50 on a first (15) of the axles, a secondary walking beam 26 arranged at each side of the frame 11 and extending lengthwise of the frame, a third journal means 36, 39 supporting the other end 68 of each main walking beam 50 on a corresponding secondary walking beam 26 intermediate the ends of the latter for oscillation of each secondary walking beam about an axis generally parallel with the pivot axis of the main walking beam 50, a fourth journal means 18–30 (rear) supporting one end of each secondary walking beam 26 on a second (14) of said axles and a fifth journal means 18–30 (front) supporting the other end of each secondary walking beam 26 on a third (13) of the axles.

From the foregoing it will be seen that the present invention achieves the objects and has the advantages set forth, and provides a sturdy and low cost triple axle suspension free from upkeep and service problems and with equal distribution of the load to all of the axles.

I claim:

1. A triple axle spring suspension adapted to be interposed between a vehicle frame and three axles each having rubber tired wheels journalled at the ends thereof, comprising a main walking beam arranged at each side of said frame and extending lengthwise thereof, a first journal means supporting said vehicle frame on each main walking beam intermediate the ends of the latter for oscillation of each main walking beam about a generally horizontal axis which is substantially fixed against lateral movement thereof with reference to the adjacent parts of said frame and main walking beam and extends transversely of said frame, a bolster, a second journal means supporting said bolster on a first of said axles, vertically yielding spring means supporting one end of said main walking beam on said bolster and permitting substantial yieldingly resisted vertical movement of said first of said axles and bolster relative to said one end of said main walking beam, a secondary walking beam arranged at each side of said frame and extending lengthwise of said frame, a third journal means supporting the other end of each main walking beam on a corresponding secondary walking beam intermediate the ends of the latter for oscillation of each secondary walking beam about an axis which is substantially fixed against lateral movement thereof with reference to the adjacent parts of said main and secondary walking beams and is arranged generally parallel with said first mentioned axis, a fourth journal means supporting one end of each secondary walking beam on a second of said axles, the axis of said fourth journal means being generally parallel with said first mentioned axis and substantially fixed against lateral movement thereof with reference to the adjacent parts of said secondary walking beams and said second of said axles, and a fifth journal means supporting the other end of each secondary walking beam on a third of said axles for oscillation about an axis which is generally parallel with said first mentioned axis and is substantially fixed against lateral movement thereof with reference to the adjacent parts of said secondary walking beams and said third of said axles, said vertically yielding spring means providing substantially the sole means permitting vertical movement of said vehicle frame with reference to all of said axles as a group, said main and auxiliary walking beams being arranged between the wheels at opposite sides of said frame and each of said secondary walking beams is arranged close to the inside faces of their supporting wheels and said main walking beams being arranged in and directly above the space between said secondary walking beams.

2. A triple axle spring suspension adapted to be interposed between a vehicle frame and three axles each having rubber tired wheels journalled at the ends thereof, comprising a main walking beam arranged at each side of said frame and extending lengthwise thereof, a first journal means supporting said vehicle frame on each main walking beam intermediate the ends of the latter for oscillation of each main walking beam about a generally horizontal axis which is substantially fixed against lateral movement thereof with reference to the adjacent parts of said frame and main walking beam and extends transversely of said frame, a bolster, a second journal means supporting said bolster on a first of said axles, vertically yielding spring means supporting one end of said main walking beam on said bolster and permitting substantial yieldingly resisted vertical movement of said first of said axles and bolster relative to said one end of said main walking beam, a secondary walking beam arranged at each side of said frame and extending lengthwise of said frame, a third journal means supporting the other end of each main walking beam on a corresponding secondary walking beam intermediate the ends of the later for oscillation of each secondary walking beam about an axis which is substantially fixed against lateral movement thereof with reference to the adjacent parts of said main and secondary walking beams and is arranged generally parallel with said first mentioned axis, a fourth journal means supporting one end of each secondary walking beam on a second of said axles, the axis of said fourth journal means being generally parallel with said first mentioned axis and substantially fixed against lateral movement thereof with reference to the adjacent parts of said secondary walking beams and said second of said axles, and a fifth journal means supporting the other end of each secondary walking beam on a third of said axles for oscillation about an axis which is generally parallel with said first memtioned axis and is substantially fixed against lateral movement thereof with reference to the adjacent parts of said secondary walking beams and said third of said axles, said vertically yielding spring means providing substantially the sole means permitting vertical movement of said vehicle frame with reference to all of said axles as a group, each of said second, fourth and fifth journal means additionally including means permitting said axles to move lengthwise of their axes relative to their respective walking beams and means translating the movement of each axle lengthwise of its axis into a forward movement of one end of each axle and a rearward movement of the opposite end thereof whereby said axles are self-steering.

3. A triple axle spring suspension adapted to be interposed between a vehicle frame and three axles each having rubber tired wheels journalled at the ends thereof, comprising a main walking beam arranged at each side of said frame and extending lengthwise thereof, a first journal means supporting said vehicle frame on each main walking beam intermediate the ends of the latter for oscillation of each main walking beam about a generally horizontal axis which is substantially fixed against lateral movement thereof with reference to the adjacent parts of said frame and main walking beam and extends transversely of said frame, a bolster, a second journal means supporting said bolster on a first of said axles, vertically yielding helical compression springs supporting one end of said main walking beam on said bolster and permitting substantial yieldingly resisted vertical movement of said first of said axles and bolster relative to said one end of said main walking beam, a secondary walking beam arranged at each side of said frame and extending lengthwise of said frame, a third journal means supporting the other end of each main walking beam on a corresponding secondary walking beam intermediate the ends of the latter for oscillation of each secondary walking beam about an axis which is substantially fixed against lateral movement thereof with reference to the adjacent parts of said main and secondary walking beams and is arranged generally parallel with said first mentioned axis, a fourth journal means supporting one end of each secondary walking beam on a second of said axles, the axis of said fourth journal means being generally parallel with said first mentioned axis and substantially fixed against lateral movement thereof with reference to the adjacent parts of said secondary walking beams and said second of said axles, and a fifth journal means supporting the other end of each secondary walking beam on a third of said axles for oscillation about an axis which is generally parallel with said first mentioned axis and is substantially fixed against lateral movement thereof with reference to the adjacent parts of said secondary walking beams and said third of said axles, said vertically yielding helical compression springs providing substantially the sole means permitting vertical movement of said vehicle frame with reference to all of said axles as a group, stop means interposed between said vehicle frame and said one end of each main walking beam and limiting their horizontal movement relative to each other transversely of the vehicle frame and stop means interposed between said bolster and said first of said axles and limiting their horizontal movement relative to each other transversely of the vehicle frame.

References Cited by the Examiner

UNITED STATES PATENTS

| | | | |
|---|---|---|---|
| 2,398,248 | 4/1946 | Reid | 280—104.5 |
| 2,459,372 | 1/1949 | Fraunfelder | 280—104.5 |
| 2,810,587 | 10/1957 | Boughner | 280—104.5 |
| 3,069,184 | 12/1962 | Hickman | 280—104.5 |

OTHER REFERENCES

German printed application, K 4752 11/63C, 5/56, Schwab.

BENJAMIN HERSH, *Primary Examiner.*

P. GOODMAN, *Assistant Examiner.*